J. ZBORNIK.
HAY RACK.
APPLICATION FILED MAR. 2, 1911.
1,025,939.
Patented May 7, 1912.
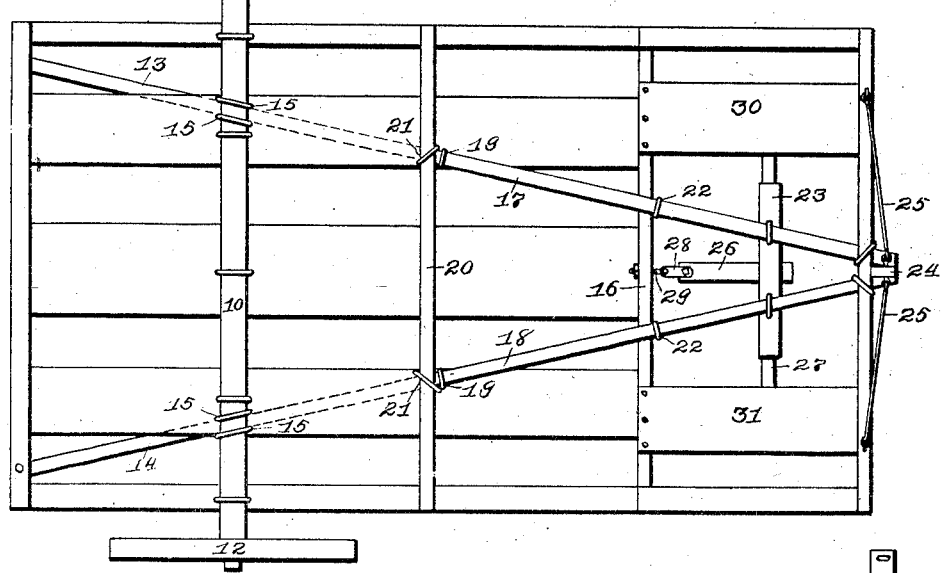
Fig. I
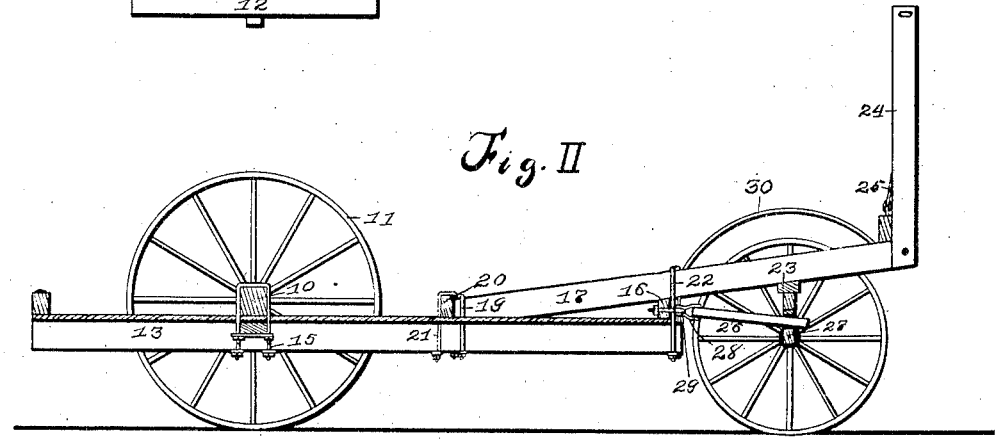
Fig. II
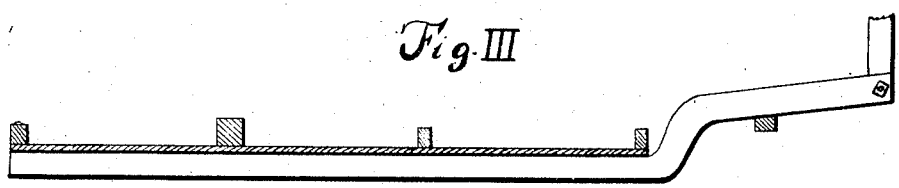
Fig. III
Witnesses
ILe W Miller
Frank Steiner
Inventor
Joseph Zbornik
By Bell G. Ra Atty.

UNITED STATES PATENT OFFICE.

JOSEPH ZBORNIK, OF FORT ATKINSON, IOWA.

HAY-RACK.

1,025,939.  Specification of Letters Patent.  Patented May 7, 1912.

Application filed March 2, 1911. Serial No. 611,843.

*To all whom it may concern:*

Be it known that I, JOSEPH ZBORNIK, a citizen of the United States, residing in Fort Atkinson, county of Winneshiek, and State of Iowa, have invented a new and useful Improvement in Hay-Racks, of which the following is a specification.

The object of my invention is to provide a hay-rack simple, strong, durable and inexpensive, in construction adapted to reduce the labor necessary for loading the hay, to minimize the jolting and swinging of the load and to facilitate travel in passing over soft ground.

My invention consists of certain details of construction hereinafter set forth, pointed out in my claim, and illustrated in the accompanying drawings in which—

Figure I shows a plan view of my improved rack; Fig. II shows a longitudinal sectional view of the same; and Fig. III shows a detail view, partially in section, of a modified form I employ.

Referring to the accompanying drawings the reference numeral 10 is used to indicate the rear axle of the truck I employ and the numerals 11 and 12 the wheels mounted thereon. The said axle is designed to be of sufficient length to permit of the wheels being at the extreme outside of the rack thereby doing away with the customary arches which are used to shield the wheels of ordinary rack wherein the rack extends over the wheels. This construction enlarges the space for hay at the point of delivery by the hay loader. I still further enlarge this space by placing, or attaching, the main beams 13 and 14 underneath the said axle 10, where they are held in position by strong clips 15. The said beams are brought forward and inward from their respective rear corners to within working distance of the front gear of the wagon where they are secured to a cross beam 16 in the manner hereinafter described.

To bring the front portion of the rack over the front gear of the wagon, and yet maintain the low position of the rack, it is necessary to splice the beams, 13 and 14 with splice beams, 17 and 18 respectively, which incline upwardly, from their points of splicing, to the front of the rack. The splice beams are beveled, on their under surfaces at their rear ends, so as to provide a flat surface to engage the main beams, as shown in Fig. II, and are secured to their respective main beams by strong clips 19, their rear extremities abutting against, and thereby being assisted in being held in position, a cross beam 20 to which the main beams are also secured by strong clips 21, as shown in Fig. II. The forward ends of the main beams are underneath the cross beam 16 and the splice beams pass over said cross beam and each main beam is secured to its respective splice beam by means of long clips 22, as shown in Fig. II.

The numeral 23 indicates a bed piece which is secured to the bolster of the front gear of the wagon, over which the splice beams pass, and are secured thereto, said splice beams being brought together to the front of the rack and being secured to the upright standard 24, thus causing the splice beams and main beams to form a triangle with the rear of the rack and thereby securing firmness and rigidity to the rack bed. The upright standard is braced by rods 25, as shown.

The numeral 26 indicates a short reach extending rearwardly from the front axle 27 to a point in close proximity to the cross beam 16, and is provided on its rear end with receiving means 28 for an eyebolt 29, secured centrally in the cross beam 16, as shown.

The boards forming the floor of my rack are designed to be over the main beams and under the rear axle and are secured in any ordinary manner. I have also provided sheet iron arches 30 and 31 over their respective front wheels which are secured to the rack in any convenient manner.

In the modified form, illustrated in Fig. III, I show steel beams which may be constructed in the conformation shown and substituted for the main and splice beams which I have hereinbefore described.

By my construction, as above set forth, it is obvious I have attained my objects. I have reduced the labor of loading hay, as discharged by the hay loader, by enlarging the holding capacity of the rack at the point where the hay is delivered, thereby not necessitating the pitching of so much hay to the front of the rack. Also as the rack bed is so low down, in relation to the discharging portion of the hay loader, it is not necessary to work the hay upward and, as the rack has larger holding capacity at the rear end, it does not have to be as long as the ordinary rack to hold a given quantity of hay and for that reason the hay need not be pitched as far forward. The wide gage of the rear wheels and the low down position of the rack also reduce the jolting and swinging of the load and, as the rear wheels do not follow the path of the front wheels which may have cut into the ground, it is obvious my rack can pass over soft ground more readily than the ordinary rack. Also, as the rear wheels are placed at the extreme outside of the rack, should one side cut into the sod the load cannot be thrown on said wheel as is the case with an ordinary wagon.

Having thus described my invention what I claim and desire to secure by Letters Patent of the United States is:

In combination, with rear and front wheeled axles, a bed located below the rear axle and secured thereto, a pair of beams having their inner ends spaced apart and secured on top of said bed and having their outer ends converging toward each other, a vertical standard secured between the outer ends of said beams, a cross beam interposed between the inner end of the bed and intermediate portions of the beams, and a reach pivoted to the cross beam and connected to the front axle.

JOSEPH ZBORNIK.

Witnesses:
 JOHN ZBORNIK,
 FRANK R. ZBORNIK.